United States Patent [19]

Seki et al.

[11] Patent Number: 5,039,749

[45] Date of Patent: Aug. 13, 1991

[54] THERMOPLASTIC ACRYLIC RESIN COMPOSITION

[75] Inventors: Junji Seki, Tokyo; Hironori Suezawa, Yokohama, both of Japan

[73] Assignee: Asahi Kasei Kogyo Kabushiki Kaisha, Osaka, Japan

[21] Appl. No.: 437,905

[22] Filed: Nov. 17, 1989

[30] Foreign Application Priority Data

Jul. 3, 1989 [JP] Japan .................................. 1-169810

[51] Int. Cl.$^5$ ...................... C08L 33/12; C08F 220/06
[52] U.S. Cl. .................................. 525/228; 525/256; 525/260; 525/309
[58] Field of Search ................ 525/228, 256, 260, 309

[56] References Cited

U.S. PATENT DOCUMENTS 4,753,988 6/1988 Henton et al. ...................... 525/228

FOREIGN PATENT DOCUMENTS 1186838 5/1985 Canada ................................ 525/228
0073450 3/1983 European Pat. Off. ............ 525/228
2253689 5/1973 Fed. Rep. of Germany ...... 525/228

Primary Examiner—John C. Bleutge
Assistant Examiner—Vasu S. Jagannathan
Attorney, Agent, or Firm—Birch, Stewart, Kolasch & Birch

[57] ABSTRACT

A thermoplastic acrylic composition comprising an acrylic particulate composite (B), which could be prepared by a sequential multi-stage polymerization method, and a thermoplastic acrylic resin (A); said composition having a characteristic morphology which is revealed under the observation of a transmission type electron microscope on a sliced specimen stained with a 1% ruthenic acid solution. Said composition shows well-balanced properties and has excellent impact resistance, lowered temperature dependency of haze, good transparency and good weatherability.

8 Claims, No Drawings

THERMOPLASTIC ACRYLIC RESIN COMPOSITION

BACKGROUND OF THE INVENTION

1. Field of the Invention

This invention relates to a thermoplastic acrylic resin composition. More particularly, it relates to a thermoplastic acrylic resin composition which has excellent transparency, impact resistance, weather resistance and stress whitening resistance and is also low in temperature dependence of haze.

2. Related Art

It is common to improve impact resistance of thermoplastic resin by means of introducing an elastomeric substance into the resin. Diene elastomers are generally used for this purpose, but employment of such diene elastomers in resin products designed for outdoor use is undesirable because of the poor weather resistance property of diene elastomers.

Many studies have been made on the use of acrylic elastomers to provide impact resistance to the resin compositions without affecting their weather resistance property. Especially, many proposals involving the use of acrylic polymers having a multilayer structure, have been made.

For example, there have been proposed the blending of a particulate composite of a 3- or 4-layer structure and a thermoplastic polymer to improve impact resistance without impairing transparency (Japanese Patent Publication No. 27576/80); use of an acrylic polymer which is basically of a three-layer structure and has, between every adjoining layers, an intermediate layer having a concentration gradient which varies at an almost constant rate (Japanese Patent Application Kokai (Laid-open) Nos. 129449/76 and 58554/78); a polymer which is basically composed of three main layers and has at least one intermediate layer between the central soft layer and the outermost layer (Japanese Patent Publication No. 36646/84 and Japanese Patent Application Kokai No. 147539/82); a polymer having a soft-hard-soft-hard four-layer structure (Japanese Patent Application Kokai No. 94947/80). These proposals are certainly effective for improving anti-stress-blushing qualities but have the problems in transparency and/or whitening, high temperature dependence of haze.

There have also been proposed a method in which in the course of polymerization of the second layer (soft layer), at a point when the polymerization rate has reached 60 to 90% by weight, the monomer mixture for the third layer (hard layer) is added and polymerized (Japanese Patent Application Kokai No. 202213/84), and a method in which the monomer mixture forming the second layer (soft layer) is partly (15 to 30% by weight) left unreacted, and the third layer monomer mixture is polymerized to thereby form a layer structure which gradually changes in composition (Japanese Patent Application Kokai No. 27516/88). These methods are capable of improving impact resistance and weathering resistance but are unable to provide good transparency to the composition.

As seen from above, many proposals have been made on the particulate composites having a multi-layer structure for the purpose of improving the defective properties of acrylic resins without impairing their favorable characteristics. These proposals have indeed provided considerable improvements on transparency, anti-stress-whitening qualities and mechanical strength, but in regard to temperature dependence of haze, no satisfactory result was obtained.

OBJECT AND SUMMARY OF THE INVENTION

An object of this invention is to provide an acrylic resin composition which is free from the defects of conventional acrylic particulate composites such as mentioned above, has excellent transparency and fluid processability which are peculiar to acrylic resins, excellent impact resistance and yet is low in temperature dependence of haze.

The present inventors have made extensive studies for improving the transparency and lowering temperature dependence of haze of impact-resistant acrylic resin compositions and, as a result, have found that said object can be attained by using an acrylic particulate composite having a specific molecular structure. This finding has led to the obtainment of the present invention.

DETAILED DESCRIPTION OF PREFERRED EMBODIMENTS

The present invention provides a thermoplastic acrylic resin composition comprising 20 to 98% by weight of a thermoplastic acrylic resin (A) which is composed solely of methyl methacrylate units or comprised of at least 80% by weight of methyl methacrylate units and 20% by weight or less of at least one kind of alkyl acrylate units, in which the alkyl group has 1 to 4 carbon atoms, and 2 to 80% by weight of an acrylic particulate composite (B), characterized in that when a ruthenic acid-stained ultra-thin section of said composition is observed under a transmission electron microscope, (a) said composition has an island-and-sea structure, and the dispersoid constituting the island has a multilayer structure consisting of concentric outer layer portions ($\alpha$ layer) stained with ruthenic acid and inner layer portion ($\beta$ layer) not stained with ruthenic acid, (b) said inner layer portion ($\beta$ layer) not stained with ruthenic acid has dispersed therein microscopically a multitude of portions stained with ruthenic acid ($\gamma$ layer), and (c) the average particle size of said $\beta$ layer is 1,500 to 2,500 Å, the average thickness of the $\alpha$ layer surrounding said $\beta$ layer is 250 to 400 Å, such that the average particle size of the island as a whole is 2,000 to 3,000 Å, and when said thermoplastic acrylic resin composition is fractionated with acetone, (d) the portion soluble in acetone occupies 30 to 98% by weight of the composition and comprises 80 to 100% by weight of methyl methacrylate units, 0 to 20% by weight of alkyl acrylate units, in which the alkyl group has 1 to 8 carbon atoms, and 0 to 20% by weight of vinyl monomer units copolymerizable therewith, and (e) the portion insoluble in acetone is 2 to 70% by weight and comprises 20 to 70% by weight of methyl methacrylate units, 10 to 75% by weight of alkyl acrylate units, in which the alkyl group has 1 to 8 carbon atoms, and 2 to 30% by weight of vinyl monomer units copolymerizable therewith, wherein the swelling index of said acetone-insoluble portion in methyl ethyl ketone is 1.5 to 6, and the tensile modulus is 1,000 to 10,000 kg/cm$^2$.

The thermoplastic acrylic resin (A) in the present invention can be obtained by polymerizing methyl methacrylate alone or by copolymerizing methyl methacrylate with 20% by weight or less of an alkyl acrylate, in which the alkyl group has 1 to 4 carbon atoms, by a conventional method.

In the preparation of said thermoplastic acrylic resin (A), the monomeric materials other than methyl methacrylate, such as alkyl methacrylate, wherein the alkyl has at least 2 carbon atoms, styrene, styrene derivatives, acrylonitrile, methacrylonitrile, etc., may be copolymerized in small quantities within the limits not prejudicial to the transparency or impact resistance of the composition.

The acrylic particulate composite (B) in the present invention is comprised of methyl methacrylate, an alkyl acrylate in which the alkyl group has 1 to 8 carbon atoms, a vinyl monomer copolymerizable therewith used for the purposes of adjusting refractive index, etc., a polyfunctional crosslinking agent and a polyfunctional grafting agent.

The acrylic particulate composite (B) can be produced by means of sequential multi-stage polymerization. The preferred method of polymerization is emulsion polymerization. Other methods are available for producing said composite (B). For instance, it can be produced by an emulsion-suspension polymerization method in which emulsion polymerization is converted into a suspension system during polymerization of the outermost layer.

Examples of said alkyl acrylate, in which the alkyl group has 1 to 8 carbon atoms are methyl acrylate, ethyl acrylate, n-butyl acrylate, 2-ethylhexyl acrylate and the like. The most preferred is n-butyl acrylate.

Examples of aromatic vinyl compounds usable in the preparation of said composite (B) are styrene and substituted styrene derivatives. Styrene is preferred.

As said polyfunctional crosslinking agent, there can be used the generally known types of crosslinking agents such as divinyl compounds, diallyl compounds, diacrylic compounds and dimethacrylic compounds. A polyethylene glycol diacrylate having a molecular weight of 200 to 600 of diacrylic compounds is most preferably used.

As said polyfunctional grafting agent, there can be used polyfunctional monomers having different functional groups, such as allyl esters of acrylic acid, methacrylic acid, maleic acid, fumaric acid and the like. Allyl methacrylate is preferred.

The thermoplastic acrylic resin composition of this invention has a specific structure typified by the facts that as noted when a ruthenic acid-stained ultra-thin section of said composition is observed under a transmission type electron microscope, (a) said composition has an island-and-sea structure, and the dispersoid constituting the island has a multi-layer structure comprising concentric outer layer portions ($\alpha$ layer) stained with ruthenic acid and an inner layer portion ($\beta$ layer) not stained with ruthenic acid, (b) said inner layer portion ($\beta$ layer) not stained with ruthenic acid has dispersed therein microscopically a multitude of portions stained with ruthenic acid ($\gamma$ layer), and (c) the average particle size of said $\beta$ layer is 1,500 to 2,500 Å, the average thickness of the $\beta$ layer surrounding said $\beta$ layer is 250 to 400 Å, and the average particle size of the island as a whole is 2,000 to 3,000 Å.

Such a specific molecular structure of the composition is considered conductive, to characterize the composition with a remarkable improvement of transparency and temperature dependence of haze without affecting the properties which are specific to acrylic resin, such as impact resistance, anti-stress-whitening qualities and weather resistance.

This could hardly be anticipated from the hitherto proposed multi-layer structured polymers.

The facts have been noted that if the inner layer portion ($\beta$ layer) which had not been stained with ruthenic acid, is not surrounded with the outer layer portion ($\alpha$ layer) which had been stained with ruthenic acid, the obtained composition is poor in mechanical strength such as impact resistance, and if the inner layer portion ($\beta$ layer), which had not been stained with ruthenic acid, has not dispersed therein microscopically a multitude of portions ($\gamma$ layer) which had been stained with ruthenic acid, the resulting composition is poor in impact strength or unsatisfactory in transparency and temperature dependence of haze.

It is essential in the present invention that the $\beta$ layer has an average particle size of 1,500 to 2,500 Å. When its average particle size is less than 1,500 Å, the obtained composition proves to be poor in transparency and temperature dependence of haze, and when said average particle size exceeds 2,500 Å, the composition is reduced in impact resistance.

The $\alpha$ layer surrounding the $\beta$ layer needs to have an average thickness of 250 to 400 Å, preferably 300 to 400 Å. When the average thickness of the $\alpha$ layer is less than 250 Å, the composition produced is poor in impact resistance, and when it exceeds 400 Å, the composition becomes unsatisfactory in transparency and temperature dependence of haze.

When the average particle size of the island as a whole is less than 2,000 Å, the composition produced is found to be poor in impact resistance, and when it exceeds 3,000 Å, the obtained composition is poor in transparency.

When the prepared thermoplastic acrylic resin composition is fractionated with acetone, if the portion soluble in acetone is less than 30% by weight, said resin composition is found to be poor in moldability and color tone, and if said portion exceeds 98% by weight, the resin composition is poor in impact resistance. In the thermoplastic acrylic resin composition of this invention, it is necessary that the portion soluble in acetone is of a composition which comprises 80 to 100% by weight of methyl methacrylate units, 0 to 20% by weight of alkyl acrylate units, in which the alkyl group has 1 to 8 carbon atoms, and 0 to 20% by weight of vinyl monomer units copolymerizable therewith. Departure from the above-defined ranges of the respective compositional units leads to an undesirable result in weather resistance or transparency. Examples of said copolymerizable vinyl monomers are alkyl methacrylate, in which the carbon number of alkyl group is 2 to 4, styrene, styrene derivatives, acrylonitrile, methacrylonitrile and the like.

On the other hand, it is necessary that the portion which is insoluble in acetone is comprised of 20 to 70% by weight of methyl methacrylate units, 10 to 75% by weight of alkyl acrylate units, in which the alkyl group has 1 to 8 carbon atoms, and 2 to 30% by weight of vinyl monomer units copolymerizable therewith. Departure from the above-defined ranges results in unsatisfactory impact resistance and transparency. Examples of vinyl monomers usable here are alkyl methacrylate, in which the number of carbon atoms contained in the alkyl group is 2 to 4, styrene, styrene derivatives, acrylonitrile, methacrylonitrile and the like.

In the thermoplastic acrylic resin composition according to the present invention, it is also necessary that the portion insoluble in acetone has a swelling index of 1.5 to 6, preferably 2 to 4.5 in methyl ethyl ketone. The composition of this invention is also required to have an elastic tensile modulus of 1,000 to 10,000 kg/cm², preferably 2,000 to 6,000 kg/cm² If said elastic modulus is outside said range, the composition becomes unsatisfactory in impact resistance, transparency and temperature dependence of haze.

For the preparation of acrylic particulate composite (B) of this invention, it is advantageous to use an emulsion polymerization method as previously stated. Polymerization temperature suited for forming the polymer or copolymer is selected from the range of 30 to 120° C., preferably 50 to 100° C. for each layer. For forming such a multi-layer structured polymer, it is expedient to use a so-called seed polymerization method according to which it is possible to form said polymer by adding and reacting stepwise the respective monomers or monomer mixtures. When carrying out the polymerization for forming the second and succeeding layers, it is necessary to select the conditions that will not allow the formation of new particles. This can be accomplished by adjusting the amount of emulsifier used so that it will not exceed the critical micell concentration. Formation or non-formation of new particles can be confirmed by observation with an electron microscope.

For adjusting the average thickness of α layer and the average particle size of β layer to the prescribed levels, it is important to properly select the amount (parts by weight) of monomer mixture, monomer/water ratio by weight, and the type and the amount of emulsifier used for each layer.

For effecting microscopic dispersion of a multitude of portions stained with ruthenic acid (γ layer) in the inner layer portion not stained with ruthenic acid (β layer), it is imperative to adequately select the composition of the β layer, its molecular weight, crosslinking density and distance between the crosslinking points and to also properly select the composition and feed of the monomer mixture constituting the portion stained with ruthenic acid.

The polymerization initiator used in the above process is not subject to any specific restrictions; it is possible to use conventional inorganic type initiator such as water-soluble persulfate, perborate, etc., singly or it may be used in combination with a sulfite, thiosulfate or the like to form a redox type initiator. It is also possible to use such redox type initiators as oil-soluble organic peroxide/ferrous salt mixture, organic peroxide/sodium sulfoxylate mixture and the like.

The acrylic particulate composite (B) having a specific structure obtained according to the abovedescribed polymerization method can be worked into a particulate solid from the state of polymer latex by subjecting it to such treatments as salting-out, coagulating washing, drying, etc., by the known methods.

The thermoplastic acrylic resin composition of this invention can be obtained by melting and kneading 2 to 80% by weight of the thus obtained acrylic particulate composite (B) and 20 to 98% by weight of the thermoplastic acrylic resin (A). The thermoplastic acrylic resin used herein may be one that was obtained according to any of the known polymerization methods such as bulk polymerization, solution polymerization, suspension polymerization, emulsion polymerization, etc. When the content of acrylic particulate composite (B) is less than 2% by weight, the obtained composition lacks impact resistance, and when its content exceeds 80% by weight, the polymer produced is dull in color tone.

In the course of kneading in the production of the composition of this invention, there can be added a stabilizer, lubricant, dye, pigment and/or other additives as required.

The composition of this invention obtained in the manner described above can be injection or extrusion molded into an article having excellent transparency and impact resistance and also low in temperature dependence of haze.

EXAMPLES

The present invention will be hereinafter described in further detail by showing the examples thereof, but it is to be understood that these examples are merely intended to be illustrative and not to be construed as limiting the scope of the invention. In the Examples and Comparative Examples described below, measurements and determinations were made by using the following methods or apparatus.

Haze

Haze of 3 mm thick specimens is measured by using an integrating-sphere haze meter at 23° C. and 70° C. The results are indicated by the following marks:
ⓞ: Haze is less than 10%.
◯: Haze is 10 to less than 20%.
Δ: Haze is 20 to less than 30%.
X : Haze is 30% or above.

Preparation of specimens for electron microscopy

Ultra-thin sections (slices) of smaller than 0.5 mm² are formed and their surfaces are cut and finished by using a diamond knife. Each of the thus prepared specimens is placed in a hermetically sealed light-shielded container and exposed therein to vapors of a 1% ruthenic acid solution for several hours and stained.

Average particle size and average thickness

A transmission type electron microphotograph (100,000X magnification) of an ultra-thin section (sample) sliced from a molded article and stained with ruthenic acid is prepared, then 100 particles in the microphotograph are selected at random and their diameter is measured. The arithmatic mean of 100 measurements is given here as average particle size (diameter). In the case of the particles which could not be regarded as spherical, the diameter along the major axis and the diameter along the minor axis are measured and their arithmatic mean is given as particle diameter. As for the average thickness, it is determined by following the similar procedure, that is, 100 particles are picked out at random, their thickness is measured, and the arithmatic mean of 100 measurements is given as an average thickness. When the thickness of a particle is non-uniform, its greatest thickness and smallest thickness are measured and their arithmatic mean is reckoned as the thickness of the particle.

Fractionation with acetone

Approximately 1.00 g of pellets are precisely weighed ($W_1$) and 30 ml of acetone is added thereto. The solution is shaken at 25° C. for 5 hours and then centrifuged at 23,000 r.p.m. and 5° C. for 30 minutes.

After removing the supernatant (a) by decantation, 30 ml of acetone is freshly added and the solution is shaken at 25° C. for one hour and then centrifuged at 23,000 r.p.m. and 5° C. for 30 minutes. After removing the supernatant (b) by decantation, the residue is dried in vacuo at 100° C. for 2 hours, then cooled to room temperature in a desiccator and the residue weight ($W_2$) is measured. The acetone insoluble matter is calculated in wt% from the following formula:

$$\text{Acetone insoluble matter} = \frac{W_2}{W_1} \times 100 \text{ (wt \%)}$$

Swelling index 30 ml of methyl ethyl ketone is added to approximately 0.5 g of pellets, and after 24-hour immersion at 25° C., the solution is shaken for 5 hours and then centrifuged at 18,000 r.p.m. and 5° C. for one hour. The supernatant is removed by decantation. Then 30 ml of methyl ethyl ketone is freshly supplied and the solution is shaken at 25° C. for one hour and then centrifuged at 18,000 r.p.m. and 5° C. for one hour. After removing the supernatant, the residue is weighed ($W_3$) Then the residue is dried in vacuo at 100° C. for 2 hours and weighed ($W_4$). The degree of swelling is calculated from the following equation:

$$\text{Swelling index} = \frac{W_3 - W_4}{W_4}$$

Compositional analysis

As for the acetone soluble matter, the supernatants (a) and (b) obtained from fractionation with acetone are poured into a large amount of methanol, and as to the acetone insoluble matter obtained by drying the precipitate in vacuo, there are used the samples obtained from acetone fractionation. Compositional analysis of each sample is performed by pyrolysis gas chromatography.

Tensile modulus

The insoluble matter obtained from acetone fractionation is compression molded at 150° C. to form a film, and test pieces measuring 15±0.5 mm in width, 0.50±0.05 mm in thickness and 70±1 mm in length are prepared therefrom. Each test piece is subjected to a tensile test at a pulling rate of 50 mm/min by setting the chuck interval at 50 mm.

The following abbreviations are used for the compounds in the Examples and Comparative Examples:
MMA: methyl methacrylate
BA: n-butyl acrylate
St: styrene
MA: methyl acrylate
ALMA: allyl methacrylate
PEGDA: polyethylene glycol diacrylate (Mw=200 or 600)
n-OM: n-octylmercaptan
HMBT: 2-(2'-hydroxy-5'-methylphenyl)benzotriazole

EXAMPLE 1

6,000 ml of ion exchange water and 12 g of sodium dihexylsulfosuccinate are supplied into a 10-liter reactor having a reflux condenser. The mixture in the reactor was stirred at 250 r.p.m. and heated to 70° C. under a nitrogen atmosphere to create a situation which is substantially free from the influence of oxygen. After the addition of 1.6 g of ammonium persulfate, a mixture (B1) consisting of 592 g of MMA, 39 g of BA, 0.16 g of HMBT and 1.6 g of ALMA is continuously added over a period of 60 minutes. Thereafter, the mixture is allowed to stand for 30 minutes. The thus produced polymer latex is cooled to 40° C., 32 g of St is added and stirred for 60 minutes. Then a mixture (B2) consisting of 128 g of BA, 0.08 g of HMBT, 1.6 g of ALMA and 1.6 g of PEGDA (Mw=200) is added, followed by further stirring for 60 minutes.

The resulting latex was heated to 70° C. and 1.6 g of ammonium persulfate is added, after which a mixture (B3) consisting of 576 g of BA, 144 g of St, 0.24 g of HMBT, 7.2 g of ALMA and 7.2 g of PEGDA (Mw=200) is continuously added over a period of 100 minutes and then the total blend is allowed to stand for 60 minutes.

Then a mixture (B4) consisting of 179 g of BA, 45 g of St, 224 g of MMA, 0.08 g of HMBT, 2.4 g of ALMA and 2.4 g of PEGDA (Mw=200) is continuously added over a period of 60 minutes, and the blend is allowed to stand for 60 minutes.

Lastly, a mixture (B5) consisting of 400 g of MMA, 32 g of BA, 1.2 g of n-OM and 0.08 g of HMBT is continuously added over a period of 20 minutes, and the blend of the mixtures is allowed to stand for 30 minutes, then heated to 95° C. and maintained in this state for one hour.

The thus prepared latex is added to a hot 3 wt% aqueous solution of sodium sulfate for effecting salting-out and coagulation, and after repeated dehydration and washing, the product is dried to obtain a particulate composite (B).

20 parts by weight of this particulate composite (B) is mixed with 80 parts by weight of a MMA-MA copolymer (MMA : MA (weight ratio)=97.5 : 2.5; $n_{sp}/C$=0.54 dl/g (measured in a 0.30 g/dl chloroform solution at 25° C.), and the mixture is pelletized at 240° C. by using a 30 mmφ double-screw extruder having a vent (Model A, manufactured by Nakatani Machinery Co., Ltd.). The pellets are molded into a prescribed test specimen by using an in-line screw injection molding machine (Model IS-75S manufactured by Toshiba Machinery Co., Ltd.) operated under the conditions of molding temperature=250° C., injection pressure=900 kgf/cm² and mold temperature=50° C., and the test specimen is subjected to determination of properties. The obtained resin composition is excellent in transparency and temperature dependence of haze and also has high impact resistance.

An ultra-thin section stained with ruthenic acid is prepared from said test specimen and observed under a transmission electron microscope. It was found that the average particle size of the β layer not stained with ruthenic acid is 2,300 Å, the average particle size of the island as a whole is 3,000 Å, the average thickness of the α layer stained with ruthenic acid is 350 Å, and the portion not stained with ruthenic acid has dispersed therein microscopically a multitude of portions (γ layer) stained with ruthenic acid.

When the pellet is fractionated with acetone, it has 18.5% of acetone insoluble matter. The swelling index in methyl ethyl ketone is 3.5. The tensile modulus of the film prepared from the acetone insoluble matter is 3,300 kg/cm².

The result of compositional analysis by pyrolysis gas chromatography showed that the acetone soluble matter is comprised of 97.3 wt% of MMA, 2.3 wt% of MA and 0.4 wt% of BA, while the acetone insoluble matter comprised 40 wt% of MMA, 47 wt% of BA and 13 wt% of St.

REFERENCE EXAMPLE 1

The procedure of Example 1 is followed except that the mixture (B1) is composed of 312 g of MMA, 249 g of BA, 62 g of St, 0.16 g of HMBT and 1.6 g of ALMA, and that PEGDA with a molecular weight of 200 is replaced with the equal amount of a PEGDA with a molecular weight of 600.

EXAMPLE 2

The procedure of Example 1 is followed except that the mixture (B1) is composed of 928 g of MMA, 56 g of BA, 0.24 g of HMBT and 2.4 g of ALMA, that 29 g of St is used as monomer to be added to the polymer latex of 40° C. and the mixture (B2) to be also added thereto is composed of 122 g of BA, 0.09 g of HMBT, 1.3 g of ALMA and 1.3 g of PEGDA (Mw=600), that the continuously added mixture (B3) is composed of 546 g of BA, 136 g of St, 0.26 g of HMBT, 7.0 g of ALMA and 7.0 g of PEGDA (Mw=600), that no mixture (B4) is used, and that the mixture (B5) is composed of 600 g of MMA, 48 g of BA, 1.84 g of n-OM and 0.16 g of HMBT.

EXAMPLE 3

The procedure of Example 1 is followed except that 44 g of St is used as the monomer to be added to the polymer latex at 40° C. and the mixture (B2) to be also added thereto is composed of 178 g of BA, 0.07 g of HMBT, 2.2 g of ALMA and 2.2 g of PEGDA (Mw=600), that the continuously added mixture (B3) was composed of 659 g of BA, 165 g of St, 0.22 g of HMBT, 8.2 g of ALMA and 8.2 g of PEGDA (Mw=600), that no mixture (B4) is added, and that the mixture (B5) is composed of 600 g of MMA, 48 g of BA, 1.8 g of n-OM and 0.16 g of HMBT.

EXAMPLE 4

6.860 ml of ion exchange water and 17.2 g of sodium dihexylsulfosuccinate are supplied into a reactor similar to that used in Example 1, and the mixture is stirred at 250 r.p.m. and heated to 75° C. under a nitrogen atmosphere.

A mixture consisting of 534.6 g of MMA, 19.4 g of BA, 0.443 g of ALMA and 0.166 g of HMBT is divided into two portions which are 2:3 in weight ratio, and the former (smaller) portion is designated as mixture (B1) and the latter (larger) portion as mixture (B2).

Mixture (B1) is added to the reactor, and 5 minutes thereafter, 0.22 g of ammonium persulfate is added, the mixed solution being allowed to stand for 45 minutes. Then mixture (B2) is continuously added over a period of 12 minutes, and the blend is allowed to stand for 20 minutes.

The resultantly obtained polymer latex is cooled to 40° C.

Then a mixture consisting of 1,141 g of BA, 259 g of St, 3.64 g of PEGDA (Mw=200), 14.84 g of ALMA and 0.42 g of HMBT is divided into 5 : 1 (in weight ratio) portions, and the former (larger) portion is designated as mixture (B3) and the latter (smaller) portion as mixture (B4). Also, a mixture consisting of 876.1 g of MMA, 11.54 g of BA, 2.66 g of n-OM and 0.27 g of HMBT is divided into 1 : 1 (in weight ratio) portions, one portion being designated as mixture (B5) and the other portion as mixture (B6). Mixture (B3) is added to the reactor and stirring is continued for 60 minutes. The resulting latex is heated to 75° C, added with 0.89 g of ammonium persulfate and allowed to stand for 190 minutes.

Then 0.53 g of ammonium persulfate is added to the reactor, followed by the addition of mixture (B4) at one time, and 2 minutes thereafter, the addition of mixture (B5) is started, which addition lasts for 90 minutes without interruption. After this addition, this blend of the mixtures is allowed to stand for 60 minutes.

Further, 0.18 g of ammonium persulfate is added to the reactor, and lastly mixture (B6) is added over a period of 20 minutes, followed by a 30-minute standing period. Then the total mixture is heated to 95° C. and kept in this state for 60 minutes.

The latex thus obtained is subjected to the same after-treatments, kneading, molding and evaluations as conducted in Example 1.

EXAMPLE 5

The procedure of Example 5 is followed except that the amount of sodium dihexylsulfosuccinate used is changed to 22.6 g, that the mixture consisting of 534.6 g of MMA, 19.4 g of BA, 0.443 g of ALMA and 0.166 g of HMBT is not divided into (B1) and (B2), and after the lapse of 5 minutes from addition of 0.22 g of ammonium persulfate, said mixture is continuously added over a period of 45 minutes, and that after this addition, the blend is allowed to stand for 20 minutes.

The results of property evaluations of the test specimens in the above Examples are shown in Table 1.

Comparative Example 1

The procedure of Example 3 is followed except that mixture (B3) is composed of 236 g of BA, 56 g of St, 0.16 g of HMBT, 2.8 g of ALMA and 2.8 g of PEGDA (Mw=600), and that mixture (B5) is composed of 916 g of MMA, 68 g of BA, 2.8 g of n-OM and 0.32 g of HMBT.

Comparative Example 2

The procedure of Example 3 is followed except that mixture (B3) is composed of 236 g of BA, 56 g of St, 0.16 g of HMBT, 2.8 g of ALMA and 2.8 g of PEGDA (Mw=600), and that mixture (B4) is composed of 316 g of MMA, 20 g of BA, 0.16 g of HMBT and 3.4 g of ALMA.

Comparative Example 3

6,860 ml of ion exchange water and 13.72 g of sodium dihexylsulfosuccinate are supplied to a reactor similar to that used in Example 1. The mixture is stirred at 250 r.p.m. and heated to 70° C. under a nitrogen atmosphere.

Then 0.74 g of ammonium persulfate is added, and 10 minutes thereafter, addition of mixture (B1) consisting of 238 g of MMA, 16.3 g of BA and 0.64 g of ALMA is started, which addition lasts for 10 minutes without interruption. Thereafter, the blend of the mixtures is allowed to stand for 30 minutes.

After the above operation, 2.85 g of ammonium persulfate is added, and after the lapse of 10 minutes from its addition, mixture (B2) consisting of 1,443 g of BA, 338 g of St and 18.9 g of ALMA is added, the addition being continued for 140 minutes without interruption, and then the blend of the mixtures is allowed to stand for 150 minutes.

The above operation is followed by another addition of 1.22 g of ammonium persulfate and, 10 minutes thereafter, further addition of mixture (B3) consisting of 718 g of MMA, 45.8 g of BA and 2.29 g of n-OM is continuously made over a period of 50 minutes, after which the blend of the mixtures is allowed to stand for 70 minutes.

The thus obtained latex is subjected to the same aftertreatments, kneading, molding and evaluations as carried out in Example 1.

Comparative Example 4

The procedure of Comparative Example 3 is followed except that the period of time of addition of mixture (B1) is 20 minutes, and that the total mixture was lastly heated to 95° C. and maintained in this state for 60 minutes.

Comparative Example 5

The procedure of Example 1 is followed except that the amount of emulsifier added is 6 g, that the period of time of addition of mixture (B1) is 120 minutes, that mixture (B3) is composed of 748 g of BA, 187 g of St, 0.24 g of HMBT, 9.4 g of ALMA and 9.4 g of PEGDA (Mw=600), that mixture (B5) is composed of 200 g of MMA, 16 g of BA, 0.64 g of n-OM and 0.08 g of HMBT, and that PEGDA with a molecular weight of 200 used in each mixture is changed to PEGDA with a molecular weight of 600.

The results of property evaluations of the test specimens in the above Comparative Examples are shown in Table 1.

It is evident from the results of Comparative Examples that when the average thickness of α layer stained with ruthenic acid is less than 250 Å, the composition produced is poor in impact resistance, and when said average thickness exceeds 400 Å, transparency and temperature dependence of haze are deteriorated.

As seen from the above, when the blend departs from the compositional ranges specified in the present invention, a composition cannot be obtained which is excellent in impact resistance, transparency and temperature dependence of haze.

TABLE 1

|  | EXAMPLES | | | | | | COMPARATIVE EXAMPLES | | | | |
|---|---|---|---|---|---|---|---|---|---|---|---|
|  | Reference | | 2 | 3 | 4 | 5 | 1 | 2 | 3 | 4 | 5 |
|  | 1 | 2 |  |  |  |  |  |  |  |  |  |
| Form of dispersion | | | | | | | | | | | |
| (1) Average particle size of β layer [Å] | 2300 | 2400 | 1800 | 2100 | 1650 | 1540 | 2280 | 2360 | 980 | 1200 | 2900 |
| (2) Average thickness of α layer [Å] | 350 | 300 | 260 | 400 | 370 | 320 | 160 | 170 | 760 | 900 | 700 |
| (3) Average particle size of island as a whole [Å] | 3000 | 3000 | 2380 | 2900 | 2390 | 2180 | 2600 | 2700 | 2500 | 3000 | 4300 |
| (4) Presence or absence of microscopically dispersed γ layers in β layer | Present | Present | Present | Present | Present | Present | Present | Present | Absent | Absent | Present |
| Properties | | | | | | | | | | | |
| Izod impact strength (kg · cm/cm) | 4.4 | 4.2 | 3.5 | 4.5 | 4.3 | 3.9 | 1.3 | 1.2 | 4.0 | 4.1 | 5.1 |
| Haze | | | | | | | | | | | |
| 23° C. | ⊙ | ⊙ | ⊙ | ⊙ | ⊙ | ⊙ | ⊙ | ⊙ | ⊙ | ⊙ | ○ |
| 70° C. | ⊙ | ⊙ | ⊙ | ⊙ | ⊙ | ⊙ | ⊙ | ⊙ | Δ | x | x |
| Analysis of acetone insolubles | | | | | | | | | | | |
| Acetone insolubles (wt %) | 18.5 | 17.3 | 17.6 | 17.7 | 16.8 | 18.2 | 14.9 | 15.1 | 17.5 | 17.1 | 18.6 |
| Swelling index | 3.5 | 3.4 | 2.9 | 2.7 | 2.8 | 2.7 | 2.6 | 1.3 | 4.7 | 4.3 | 3.2 |
| Tensile modulus (kg/cm²) | 3300 | 2500 | 6000 | 2000 | 2500 | 2400 | 8710 | 9100 | 2200 | 2330 | 3000 |
| Compositional analysis | | | | | | | | | | | |
| Acetone solubles | | | | | | | | | | | |
| MMA (wt %) | 97.3 | 97.4 | 97.2 | 97.1 | 97.4 | 97.3 | 97.1 | 97.2 | 97.2 | 97.4 | 97.4 |
| MA (wt %) | 2.3 | 2.3 | 2.0 | 2.3 | 2.4 | 2.3 | 1.8 | 2.0 | 2.0 | 2.5 | 2.5 |
| BA (wt %) | 0.4 | 0.3 | 0.8 | 0.6 | 0.2 | 0.4 | 1.1 | 0.8 | 0.8 | 0.1 | 0.1 |
| Acetone insolubles | | | | | | | | | | | |
| MMA (wt %) | 40 | 26 | 52 | 33 | 40 | 40 | 68 | 74 | 38 | 39 | 40 |
| BA (wt %) | 47 | 59 | 38 | 54 | 49 | 48 | 27 | 22 | 58 | 58 | 48 |
| ST (wt %) | 13 | 15 | 10 | 13 | 11 | 12 | 5 | 4 | 4 | 3 | 12 |

| Marks | Haze |
|---|---|
| ⊙ | less than 10% |
| ○ | 10 to less than 20% |
| Δ | 20 to less than 30% |
| x | 30% or more |

According to the present invention, there is provided an acrylic resin composition which is free of the defects possessed by the conventional acrylic particulate composites and which has excellent impact resistance and temperature dependence of haze while having good transparency and moldability which are specific to acrylic resins.

What is claimed is:

1. A thermoplastic acrylic resin composition comprising 20 to 98% by weight of a thermoplastic acrylic resin (A) composed solely of methyl methacrylate units or comprised of at least 80% by weight of methyl methacrylate units and 20% by weight or less of at least one kind of alkyl acrylate units in which the alkyl group has 1 to 4 carbon atoms, and 2 to 80% by weight of an acrylic particulate composite (B), characterized in that when an ultra-thin section sliced from said thermoplastic acrylic resin composition and stained with ruthenic acid is observed under a transmission electron microsope, (a) said composition has an island-and-sea structure, and the dispersoid constituting said island has a multi-layer structure consisting of concentric outer layer portions ($\alpha$ layer) stained with ruthenic acid and an inner portion ($\beta$ layer) not stained with ruthenic acid, wherein said $\alpha$ layer is a polymerization reaction product of the polymerization of a monomer comprising a $C_1$–$C_8$ alkyl acrylate, styrene and allyl methacrylate or allyl methacrylate and a different poly-functional monomer and said $\beta$ layer is a polymerization reaction product of the polymerization of a monomer mixture comprising methyl methacrylate, a $C_1$–$C_8$ alkyl acrylate and allyl methacrylate, (b) the inner layer portion ($\beta$ layer) not stained with ruthenic acid has dispersed therein microscopically a multitude of portions ($\gamma$ layer) stained with ruthenic acid, and (c) the average particle size of said $\beta$ layer is 1,500 to 2,500 Å, the average thickness of the $\alpha$ layer surrounding said $\beta$ layer is 250 to 400 Å, such that the average particle size of the island as a whole is 2,000 to 3,000 Å, and when said thermoplastic acrylic resin composition is fractionated with acetone, (d) the portion soluble in acetone occupies 30 to 98% by weight of the composition and comprise 80 to 100% by weight of methyl methacrylate units, 0 to 20% by weight of alkyl acrylate units, in which the alkyl group has 1 to 8 carbon atoms, and 0 to 20% by weight of vinyl monomer units copolymerizable therewith, and (e) the portion insoluble in acetone is 2 to 70% by weight and comprise 20 to 70% by weight of methyl methacrylate units, 10 to 75% by weight of alkyl acrylate units, in which the alkyl group has 1 to 8 carbon atoms, and 2 to 30% by weight of vinyl monomer units copolymerizable therewith, wherein the swelling index of said acetone-insoluble portion in methyl ethyl ketone is 1.5 to 6, and the tensile modulus is 1,000 to 10,000 kg/cm$^2$.

2. The thermoplastic acrylic resin composition according to claim 1, wherein the average thickness of $\alpha$ layer is 300 to 400 Å.

3. The thermoplastic acrylic resin composition according to claim 1, wherein the swelling index of the portion insoluble acetone in methyl ethyl ketone is 2 to 4.5, and the tensile modulus is 2,000 to 6,000 kg/cm$^2$.

4. The thermoplastic acrylic resin composition according to claim 1, wherein the alkyl acrylate of said $\alpha$ layer and said $\beta$ layer are each methyl acrylate, ethyl acrylate, n-butyl acrylate or 2-ethylhexyl acrylate.

5. The thermoplastic acrylic resin composition according to claim 1, wherein the different polyfunctional monomer of said $\alpha$ layer is a polyfunctional crosslinking agent selected from a divinyl compound, a diallyl compound or a di(meth)acrylic compound.

6. The thermoplastic acrylic resin composition according to claim 5, wherein the polyfunctional crosslinking agent is a polyethylene glycol diacrylate having a molecular weight of 200 to 600.

7. The thermoplastic acrylic resin composition according to claim 1, wherein the different polyfunctional monomer of said $\alpha$ layer is a polyfunctional grafting agent selected from an ally ester of (meth) acrylic acid, maleic acid or fumaric acid.

8. The thermoplastic acrylic resin composition according to claim 1, wherein the acrylic particulate composite (B) is produced by sequential multi-stage polymerization.

* * * * *

UNITED STATES PATENT AND TRADEMARK OFFICE
CERTIFICATE OF CORRECTION

PATENT NO. : 5,039,749
DATED : August 13, 1991
INVENTOR(S) : Junji SEKI et al

It is certified that error appears in the above-identified patent and that said Letters Patent is hereby corrected as shown below:

Column 13, line 10, after "monomer" insert --mixture--.

Signed and Sealed this

Twenty-first Day of September, 1993

Attest:

BRUCE LEHMAN

Attesting Officer

Commissioner of Patents and Trademarks